April 21, 1936.   H. FILIPPI   2,037,856
CUTTER WIRE
Filed Nov. 21, 1935   2 Sheets-Sheet 1
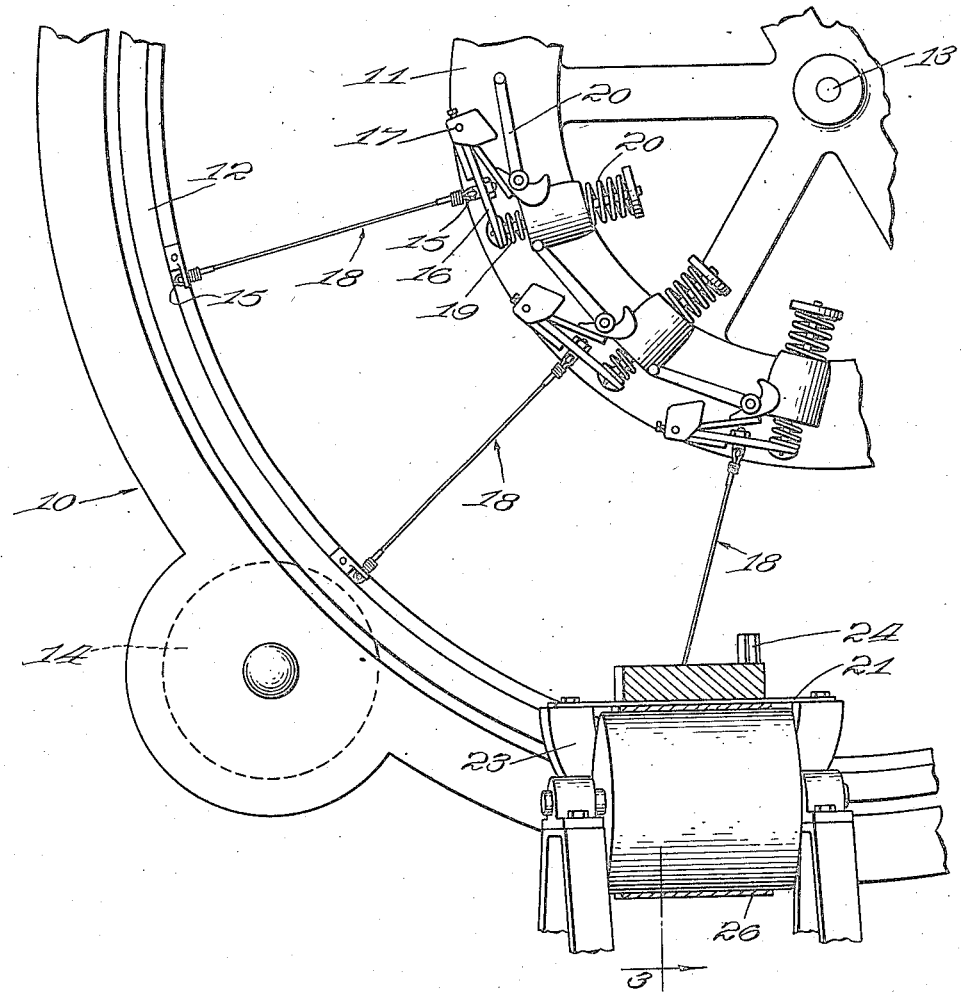
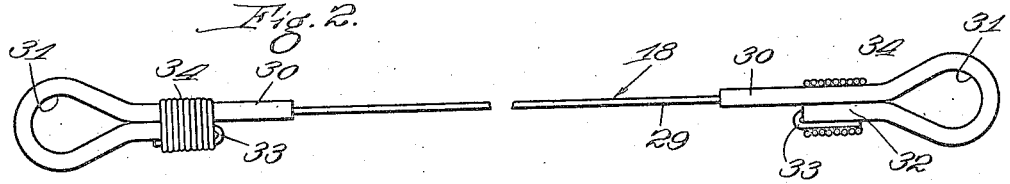
Inventor:
Hugo Filippi.
By Dyrenforth, Lee, Chritton & Wiles
Attys.

April 21, 1936. H. FILIPPI 2,037,856
CUTTER WIRE
Filed Nov. 21, 1935 2 Sheets-Sheet 2
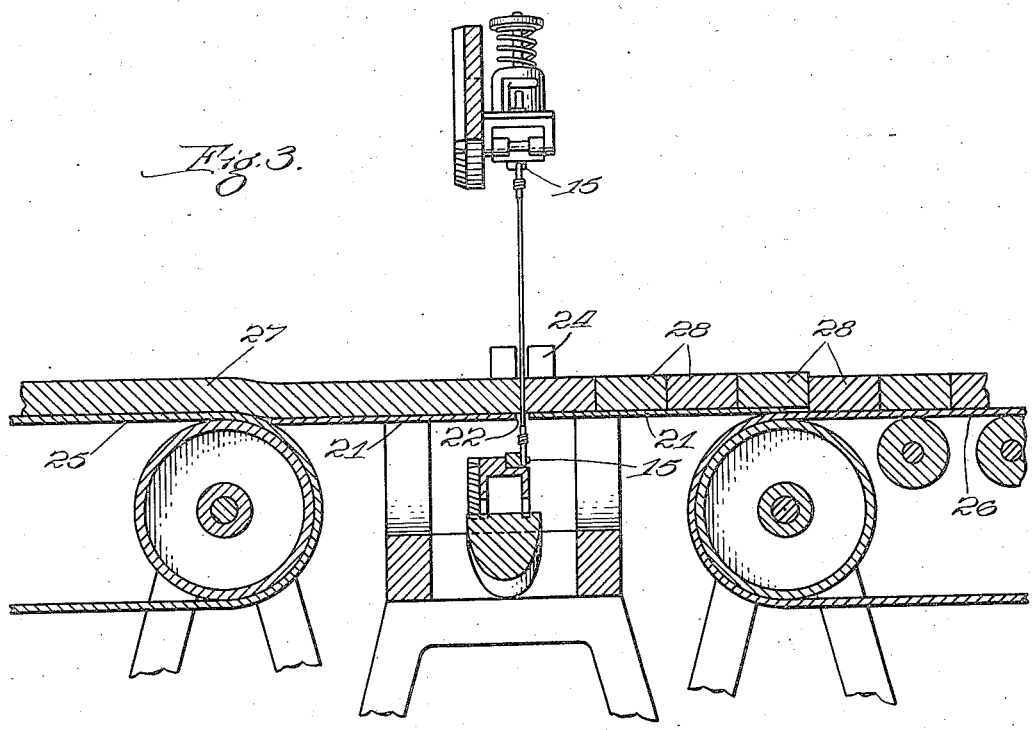
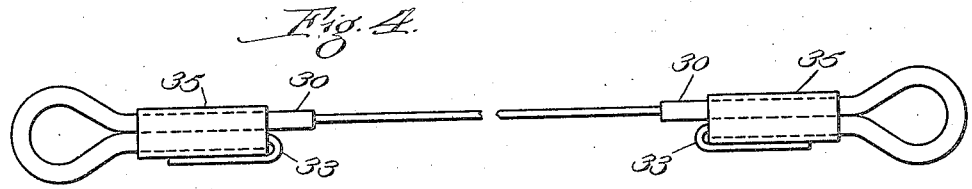
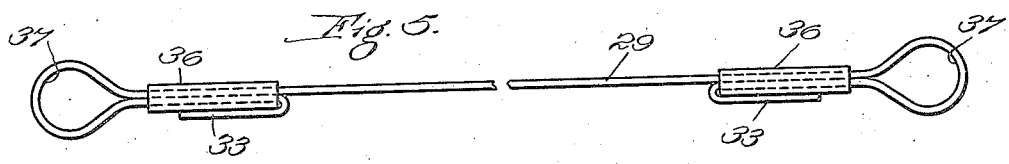
Inventor:
Hugo Filippi.
By Dyrenforth, Lee, Chritton & Wiles.
Attys.

Patented Apr. 21, 1936

2,037,856

UNITED STATES PATENT OFFICE 2,037,856

CUTTER WIRE

Hugo Filippi, Chicago, Ill., assignor to Illinois Brick Company, a corporation of Illinois Application November 21, 1935, Serial No. 50,950

10 Claims. (Cl. 25—110)

This invention relates to improvements in cutting wires used in machines for cutting clay or plastic materials, and more particularly to a method of increasing the resistance of such cutter wires to premature breakage.

One object of this invention is to provide a cutter wire with an integral loop so formed as to minimize breakage and structural failure either in the loop or other portions of the cutter wire; another object of this invention is to produce a cutter wire having longer service life, with a consequent reduction in wear and tear and frequent stoppage of the cutter machine mechanism with which it is used; yet another object of this invention is to provide means of mechanically strengthening the loop of the cutter wire; a further object of this invention is to provide a cutter wire in which all twisting is eliminated and the forces and stresses acting on the body of the cutter wire, and on the loops thereof, produce a minimum amount of secondary stress and bending; other objects and advantages of this invention will be apparent from the following specification and the drawings, in which—

Figure 1 is a fragmentary elevation of a clay cutting machine; Figure 2 is a view, partly in section, of a cutter wire; Figure 3 is a sectional view along the line 3 of Fig. 1; Figure 4 is an elevation, partly broken away, of a modified form of cutter wire; and Figure 5 is a similar view of another modification.

Clay and similar plastic materials which it is desired to cut into blocks and then to bake are commercially fed in a sheet or strip into a cutting machine which separates the strip into blocks of the desired size. These blocks are then removed, as by a conveyor, for subsequent operations. In the commercial manufacture of bricks, for example, a strip of clay of the requisite depth and width is fed to a cutting machine which continuously cuts the strip into blocks of a size approximating the desired finished bricks. This cutting is generally done by cutter wires mounted on a large rotating wheel or holder. The resistance of the wet clay imposes heavy strains on the cutter wire, and frequent breakages have resulted. Particular trouble in this regard has been encountered in connection with the loop or eye on the end of the cutter wire, which loop is adapted to engage a holding pin on the machine. These loops were generally formed by bringing the end of the wire around and back and then twisting the free end around the body portion of the wire and soldering it or welding it there. The secondary stresses and strains produced at these twisted points by the severe conditions encountered in cutting clay bricks manufactured at a high rate of production, for example, caused frequent and early breakage of the cutter wire long before normal wear and abrasion of the body and cutting portion would have ended its usefulness.

This invention eliminates the difficulties described above in that it enables a cutter wire to be produced having a loop formed in a manner producing little or no secondary stress. This is achieved by bending the end of the cutter wire into a loop and back in a direction substantially parallel to and adjacent a part of the substantially straight body or cutting portion of the wire. The parallel parts are mechanically bound together, as by a tube or a wire winding and are preferably welded or soldered together. This construction forms a loop on the end of the cutter wire without any sharp bends in the wire and enables the greatest strain to be exerted axially on the wire rather than transversely. This invention also reinforces the loop and the wire immediately adjacent thereto by some reinforcing means, as a tube slipped over the wire and welded or soldered thereto.

In a particular embodiment of the invention illustrated herewith a clay cutting machine 10 is shown having a rotating member or wheel comprising an inner portion 11 and an outer rim portion 12. The inner portion is rotatably mounted on the axis 13 and the rim portion is rotatably carried, as by the revolving supporting member 14. Both the inner member and the rim member are synchronously driven so that they maintain a fixed, or substantiallly fixed, relation to each other. Both the inner and outer members of the cutting machine are provided with pins or hooks 15. The pins on the rim member 12 are here shown as rigidly attached thereto, while the pins 15 on the inner rotatable member are carried by a holding member 16 which is pivotably mounted on the member 17 on the rotatable member 11. The cutter wire 18 lies between opposite pins and has loops on the end thereof which engage the pins 15. Springs 19 and 20 serve to keep the cutter wire 18 under considerable tension, and yet allow the wire to yield slightly under the stress of cutting. Lever and cam means 20 are provided whereby the tension of the springs 19 and 20 may be manually overcome when it is desired to renew or replace a cutting wire.

A cutting table or bed 21 is so located that the cutter wires 18 pass through a slot 22 extending thereacross. Rigid supporting means 23 are provided for the bed 21. A stop or plate 24 projects above the bed on one side thereof, and this stop is also slotted to permit the passage of the cutter wires therethrough. Conveyor means 25 and 26 are operatively mounted adjacent each end of the bed or plate 21.

A continuous stream or strip 27 of clay or other plastic material, previously formed and shaped, is fed on to the bed 21 and across the slot 22. The members 11 and 12 are rotated, causing the cutter wires 18 to pass through the strip 27, which is prevented from moving sideways by the stop 24, thus separating the clay into blocks or bricks 28. These bricks of unbaked clay are, for example, then removed by the conveyor 26 and subjected to further operations not connected with the present invention. In order that the operation may be a continuous one the direction of motion of the strip 27 is not exactly at right angles to the plane of rotation of the cutter wires, 18, but is at an angle thereto depending upon the speed of rotation of the members bearing the cutting wires. The spacing of the cutter wires, their speed, and the speed at which a strip 27 is fed are synchronized, to form bricks 28 of the desired width between cuts.

A preferred form of the cutter wire is illustrated in Fig. 2. In this form a wire has a substantially straight body or cutting portion 29. A tube or reinforcing means 30 is slipped over a portion of the wire. Since the construction of the loop at each end of the cutting wire 18 is substantially identical, only one end will be here described. This tube 30 has an internal diameter substantially equal to or only slightly greater than the diameter of the wire with which it is used. The tube and wire are bent around and back so that a loop 31 is formed and so that a part of the tube and wire, here indicated as 32, is substantially parallel to the central portion 29. The free end of the wire 33 is again doubled back to form a hook. The hold is then strengthened by reinforcing means, here shown as a wire binding 34, which may be soldered or welded in place. It is to be understood that the wire 29 may also be soldered or welded into the tube 30 if desired. The strain imposed by the pull of the cutting wire 18 against the pin 15 engaged by the loop 31 is carried around the wire and tube and exerted on the cutting portion 29 and the free end 33. In both cases practically all of the strain is in a direction axial to the wire, and the resistance of the wire to breakage is much greater than where a large portion of the strip is transverse of the wire.

It will be seen that the forces acting against the loop 31 bearing against the pin 15 will be carried downward by the gradual transition, and finally by direct axial tension to the body of the cutter wire and to the free end 33. In this manner all portions of the cutter wire are subject to simple tensile stress and are not subjected to localized overstress incident to or caused by sharp twisting or secondary bending.

The free end or hook 33 is provided to guard against slipping of that end of the wire, and acts as a further means of causing the stressed portions of the loop and of the cutter wire to act in unison. It is preferably formed and then held in place by the reinforcing means or binding wire 34. As previously stated it is also contemplated that the body portion 29 and the free end 33 of the wire be held in proper relation to the tube 30, so that stresses in the loop 31 are shared equally thereby, by means of soldering or welding the tube on to the wire.

In the particular embodiment of this invention illustrated in Fig. 4, a second reinforcing means or tube 35 is placed around the parallel parts of the tube 30. The free end 33 may be turned back outside of this second reinforcing means 35, as here shown, and soldered or welded thereto. The tube or reinforcing means 35 is also preferably mechanically fastened to the tube 30.

The embodiment of the cutter wire illustrated in Fig. 5 is designed for use with relatively light strains, yet where the strains are sufficient to cause breakage of twisted loops. In this form a reinforcing means or ferrule 36 is slipped over the wire and down onto the cutting portion 29. A loop 37 is then formed in the wire, the ferrule slipped into the position illustrated, and the free end 33 formed into a hook. Soldering or welding or the like may then be used to mechanically bind the parts into an integral unit.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

I claim:

1. A cutter wire for a clay cutting machine, including: a substantially straight central portion; a portion formed into a loop adapted to engage a pin on said machine; a part extending from said loop substantially parallel and adjacent to said central portion; and reinforcing means enclosing said part and the part of said central portion adjacent thereto.

2. A cutter wire for a clay cutting machine, including: a substantially straight central portion adapted to cut a strip of clay fed to said machine; a portion formed into a loop adapted to engage a pin on said machine; a part extending from said loop substantially parallel to said central portion; and reinforcing means enclosing the part of said wire.

3. A cutter wire for a clay cutting machine including: a substantially straight central portion adapted to cut a strip of clay fed to said machine; a portion formed into a loop adapted to engage a pin on said machine; a part extending from said loop substantially parallel to a part of said central portion, said part comprising the free end of said wire; tube means enclosing said part; and reinforcing means surrounding said parallel parts.

4. A cutter wire for a cutting machine, including: a substantially straight central portion; a tube surrounding a portion of said wire near the end thereof, said tube and wire being formed into a loop, and having a part thereof substantially parallel to and adjacent said central portion; and reinforcing means holding said part of the central portion adjacent thereto together.

5. A cutter wire for a cutting machine, including: a substantially straight central portion; a tube surrounding a portion of said wire near the end thereof, said tube and wire being formed into a loop and having a part thereof substantially parallel to and adjacent a part of said central portion; and reinforcing means surrounding said parts.

6. Apparatus of the character claimed in claim 5, wherein the free end of said wire is doubled back parallel to said parts.

7. A cutter wire for a clay cutting machine, including: a substantially straight central portion adapted to cut a strip of clay fed to said machine; a tube surrounding a portion of said wire near the end thereof, said tube and wire being formed into a loop adapted to engage a pin on said machine, said tube and wire having a part thereof substantially parallel to and adjacent a part of said central portion surrounded by said tube; a hook formed by doubling the free end of said wire back parallel to said parts; and reinforcing means surrounding said hook and said parts and fastening them into an integral unit.

8. A cutter wire for a cutting machine, including: a substantially straight central portion; a portion formed into a loop and having a part thereof substantially parallel to and adjacent said central portion; and a ferrule surrounding said part and the part of said central portion adjacent thereto.

9. A cutter wire for a clay cutting machine, including: a substantially straight central portion adapted to cut a strip of clay fed to said machine; a portion formed into a loop adapted to engage a pin on said machine, said last named portion having a part thereof substantially parallel to and adjacent said central portion; reinforcing ferrule means enclosing said part and the part of said central portion adjacent thereto; and a hook formed by doubling back the free end of said wire.

10. Apparatus of the character claimed in claim 9 wherein said hook, said ferrule, and said two parts are held together in an integral unit by fastening means.

HUGO FILIPPI.